UNITED STATES PATENT OFFICE.

HENRY H. KREAMER, OF READING, PENNSYLVANIA.

IMPROVEMENT IN COMPOSITIONS FOR REMOVING INCRUSTATION.

Specification forming part of Letters Patent No. 190,770, dated May 15, 1877; application filed February 22, 1877.

*To all whom it may concern:*

Be it known that I, HENRY H. KREAMER, of Reading, in the State of Pennsylvania, have invented an Improved Composition for Removing Incrustation from Boilers, of which the following is a specification:

The principal ingredients I make use of are slippery-elm bark, extract of hemlock-bark, and aqua-ammonia, and sugar.

I take in the proportion of about five pounds of slippery-elm bark, and mix the same into fifteen gallons of boiling water, and allow the mass to remain about six hours.

To another fifteen gallons of water, I add about one hundred pounds of extract of hemlock-bark, and about five pounds of aqua-ammonia, and about ten pounds of sugar.

The two mixtures are put together and thoroughly stirred, and the same forms my improved compound for removing scale from boilers and cleaning the same.

This semi-liquid compound is introduced into the boiler in quantities proportioned to the condition of the boiler and the character of the water made use of in the same. After the scale has been removed, the quantity of the said compound required to prevent the deposit of fresh scale will be small, and it should be introduced at intervals, as required.

I claim as my invention—

The boiler-cleaning compound consisting of a solution of slippery-elm bark and water, extract of hemlock-bark, or equivalent astringent, and aqua-ammonia, and sugar, substantially as set forth.

Signed by me this 17th day of February, A. D. 1877.

HENRY H. KREAMER.

Witnesses:
F. M. BANKS,
FRANK B. RULER.